J. H. GUEST.
Horse-Hoof Protectors.
No. 156,342.      Patented Oct. 27, 1874.
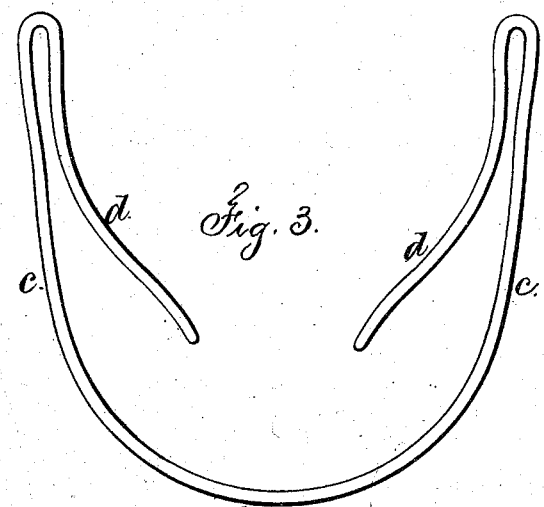
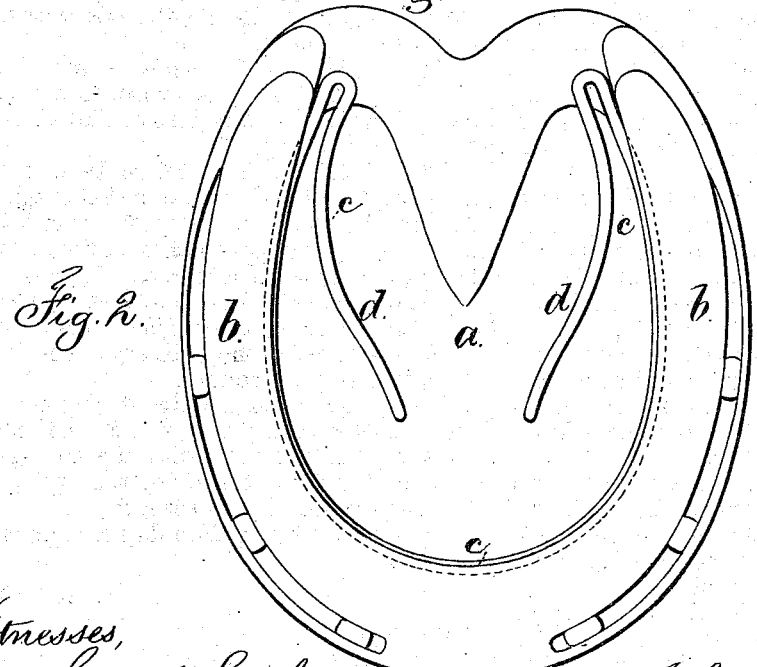
Witnesses,                                                                            Inventor
John H. Guest
per L. W. Serrell
Atty.

UNITED STATES PATENT OFFICE.

JOHN H. GUEST, OF BROOKLYN, NEW YORK.

IMPROVEMENT IN HORSE-HOOF PROTECTORS.

Specification forming part of Letters Patent No. 156,342, dated October 27, 1874; application filed August 29, 1874.

*To all whom it may concern:*

Be it known that I, JOHN H. GUEST, of Brooklyn, in the county of Kings and State of New York, have invented an Improvement in Horse-Hoof Protectors, of which the following is a specification:

The hoofs of horses often become diseased or injured in the frogs and soles, causing lameness. To remedy this the inside of the shoe is often filled or "stuffed" with protecting or healing substances, and the hoof tied up in a canvas or cloth bag. This is annoying to the horse and is kicked off, and when the stuffing only is depended upon the same is liable to fall out.

My improvement is made for retaining the stuffing material within the horseshoe and not interfering with the comfort of the horse in standing or moving. The same means may be employed for retaining a piece of felt or other material for protecting the horse's frog from injury.

In the manufacture of horseshoes the inner edge is usually beveled, so that there is a recess between the hoof and shoe. Around this inner edge of the shoe I make use of a spring-clip, adapted to set into this recess and retain the stuffing or the edges of a covering of cloth, canvas, felt, sponge, or similar material, such spring being shaped to expand within the said recess and to press upon the surface of the cloth or stuffing and retain the same firmly into its place.

In the drawing, Figure 1 is a section of the hoof, shoe, stuffing, and spring-clip. Fig. 2 is an inverted plan of the hoof and shoe with only the spring-clip in place, and Fig. 3 is a view of the spring-clip detached.

The hoof $a$ is shod with the shoe $b$, of ordinary construction; and $c$ is a spring-clip, fitting within the shoe and setting into the recess of said shoe, and retained by the expansion of the spring-clip pressing such clip into the recess of the shoe and between the shoe and between the shoe and the hoof. The ends $d$ of the wire forming the spring-clip are returned within the arc of the clip, and these springs yield to accommodate the thickness of the material used as a stuffing or protection to the frog or sole and under side of the hoof, and aid in holding the same in place.

It will be evident that the stuffing material $f$ will be held into the hoof by this spring-clip, and that a piece of cloth, canvas, or other protection, $g$, will also be held in place, and by the use of the cloth $g$ the frog will be protected even when the horse is in use, and the protection will not interfere in the least with movements of the horse.

This spring may be made of any desired material other than brass wire, as can easily be understood by any person skilled in the art.

I do not claim an india-rubber tube held into a horse's shoe by a spring-clip that enters cavities in the shoe; nor a spring with catches also entering similar notches in the shoe and having a web attached thereto. In these cases the shoes have to be made with special recesses for receiving the catches. My improvement is adapted to the ordinary beveled shoe.

I claim as my invention—

The spring-clip $c$, adapted to expand into the space between the hoof and inner edge of the shoe, and provided with the spring-ends $d$, returned within the arc of the spring-clip, for the purposes and as set forth.

Signed by me this 26th day of August, A. D. 1874.

J. H. GUEST.

Witnesses:
GEO. T. PINCKNEY,
GEO. D. WALKER.